(12) United States Patent
Lanier et al.

(10) Patent No.: US 7,270,842 B1
(45) Date of Patent: Sep. 18, 2007

(54) THERMAL GELATION OF FOODS AND BIOMATERIALS USING RAPID HEATING

(75) Inventors: Tyre Lanier, New Hill, NC (US); Josip Simunovic, Raleigh, NC (US); Kenneth R. Swartzel, Raleigh, NC (US); J. Michael Drozd, Raleigh, NC (US); Alexander Riemann, Raleigh, NC (US)

(73) Assignees: North Carolina State University, Raleigh, NC (US); Industrial Microwave Systems, L.L.C., Wilmington, DE (US)

( * ) Notice: Subject to any disclaimer, the term of this patent is extended or adjusted under 35 U.S.C. 154(b) by 327 days.

(21) Appl. No.: 10/129,776

(22) PCT Filed: Nov. 13, 2000

(86) PCT No.: PCT/US00/31171

§ 371 (c)(1),
(2), (4) Date: Jan. 16, 2003

(87) PCT Pub. No.: WO01/33978

PCT Pub. Date: May 17, 2001

Related U.S. Application Data

(60) Provisional application No. 60/164,868, filed on Nov. 12, 1999, provisional application No. 60/164,869, filed on Nov. 12, 1999.

(51) Int. Cl.
*A23L 3/00* (2006.01)
*H05B 6/64* (2006.01)

(52) U.S. Cl. ........................ 426/241; 219/678

(58) Field of Classification Search ............... 426/241, 426/237, 238, 239, 240; 219/678, 679, 680, 219/681
See application file for complete search history.

(56) References Cited

U.S. PATENT DOCUMENTS

| | | | |
|---|---|---|---|
| 3,665,142 | A | 5/1972 | Johnson |
| 3,830,945 | A | 8/1974 | Scharfman |
| 4,039,694 | A | 8/1977 | Giddey et al. |
| 4,224,348 | A | 9/1980 | Hayashi et al. |
| 4,237,145 | A | 12/1980 | Risman et al. |
| 4,371,554 | A | 2/1983 | Becker |
| 4,448,793 | A | 5/1984 | Akesson |
| 4,808,425 | A | 2/1989 | Swartzel et al. |
| 4,853,238 | A | 8/1989 | Huang |
| 4,935,253 | A | 6/1990 | Dumas et al. |
| 4,968,865 | A * | 11/1990 | Seaborne et al. .......... 219/759 |
| 4,975,246 | A | 12/1990 | Charm |
| 5,073,141 | A | 12/1991 | Lemmer |
| 5,087,465 | A | 2/1992 | Chen |
| 5,387,426 | A * | 2/1995 | Harris et al. ................ 426/573 |
| 5,431,936 | A | 7/1995 | Leger |
| 5,759,602 | A | 6/1998 | Kobussen et al. |
| 5,939,118 | A | 8/1999 | Cox et al. |
| 6,036,981 | A | 3/2000 | Budolfsen et al. |
| 6,087,642 | A | 7/2000 | Joines et al. |
| 6,096,367 | A | 8/2000 | Hoashi et al. |
| 6,265,702 | B1 | 7/2001 | Drozd et al. |
| 6,586,037 | B1 * | 7/2003 | Tada et al. .................. 426/656 |

\* cited by examiner

*Primary Examiner*—Daniel Robinson
(74) *Attorney, Agent, or Firm*—Garvey, Smith, Nehrbass & North, L.L.C.; Charles C. Garvey, Jr.; Seth M. Nehrbass

(57) ABSTRACT

The invention uses rapid heating to effect a material property change in a biomaterial. The biomaterial is heated to a predetermined real temperature, whereas the biomaterial's total thermal treatment is described by an equivalent temperature and an equivalent time defining a point above a minimum gel set temperature line, above a reduction in bacteria line, below a water loss line, and below a maximum gel set temperature line. According to one aspect of the invention, the biomaterial is heated by exposing the biomaterial to a relatively uniform electric field. The material is heated to a predetermined temperature for a predetermined time in order to achieve a food product characterized by a preselected refrigerated shelf life of from about two weeks to about forty-two weeks. The food product may be packaged prior to the microwave exposure so as to sterilize the packaging and decrease product loss. According to another aspect of the invention, the material is heated to a predetermined real temperature $T_1$ from time A to time B and a real temperature $T_2$ from time B to time C. According to another aspect of the invention, the material is heated to a predetermined real temperature from time A to time B to attain a material property at shear stress level $S_1$ and heated to a predetermined real temperature from time B to time C to attain at least one additional material property at shear stress level $S_2$. According to another aspect of the invention, the material is moved at a predetermined rate $R_1$ from time A to time B and a predetermined rate $R_2$ from time B to time C. The material is preferably stationary (i.e. $R_2=0$) from time B to time C. According to another aspect of the invention, multiple microwave cavities are used to effect the material property change in the biomaterial. The material is passed through a second microwave cavity that is sequentially arranged or concurrently arranged with the first microwave cavity.

24 Claims, 8 Drawing Sheets

THERMAL GELATION OF FOODS AND BIOMATERIALS USING RAPID HEATING

This application claims the benefit of U.S. Provisional Application No. 60/164,868 filed Nov. 12, 1999, which is incorporated by reference herein, and U.S. Provisional Application No. 60/164,869 also filed Nov. 12, 1999, which is also incorporated by reference herein.

BACKGROUND

The invention relates to the thermal gelation of foods and biomaterials, and more specifically, to the thermal gelation of foods and biomaterials using rapid heating. It is known in the art that some foods and biomaterials become hard as a result of boiling or frying, and the reason for this change is that the proteins coagulate and bind the components of the product together. It is also known that coagulation may be obtained by other types of heating such as microwave exposure.

There are several ways to expose food or biomaterial to microwave energy. For example, U.S. Pat. No. 4,237,145 to Risman et al. describes pumping eggs through a tube that is transparent to microwaves. U.S. Pat. No. 5,087,465 to Chen describes filling tubs with soybean milk and using a conveyor belt to carry the tubs through a microwave oven. U.S. Pat. No. 4,448,793 to Akesson describes filling a hollow mold with a meat paste and using two conveyor belts to pass the filled mold through a microwave waveguide.

One advantage of boiling or frying is that it is possible to use an equivalent point method to analyze the thermal effects on products. See U.S. Pat. No. 4,808,425 to Swartzel et al., which is hereby incorporated by reference. To determine the equivalent point of a thermal system, a complete thermal history of the treatment must be available. This is obtained by measuring mixed mean product temperatures at various locations (entrance to the heat exchanger, exit of the heat exchanger, and at least two locations inside the heat exchanger). Time is calculated by correlating mean residence time with location of the temperature probe. If it is difficult or impractical to insert thermal probes, time-temperature curves are calculated based on knowledge of the product's physical characteristics and on the geometry of the processing equipment.

There are three primary reasons that an equivalent point method has not been used with rapid heating, and more specifically microwaves. First, the microwave signal attenuates as it moves away from its source. As a result, the material is heated more at one end of the microwave than at the other end. This attenuation versus propagation distance increases as lossy materials are introduced. Second, because the magnitude of the electric field in the microwave signal has peaks and valleys due to forward and reverse propagation, the material is exposed to hot spots that heat the material unevenly. Third, there is a field gradient between conducting surfaces. As a result, materials near the conducting surface are heated less. A fourth reason is that some food products, i.e. food products high in fat, may require pretreatment at a lower temperature.

As explained in the '425 patent to Swartzel et al., treatment temperatures are primarily limited by the ability to accurately time the duration of the thermal treatment: as temperature is increased the treatment time must be decreased, and shorter treatment times are more difficult to administer with precision. As explained in more detail below, treatment times are also complicated by the length of the object to be heated. Utilizing the techniques discussed below, it is not only possible to use an equivalent point method in a microwave system, but it is also possible to achieve higher temperatures and shorter treatment times than previously thought possible. It is also possible to overcome the problems associated with longer objects. As a result, it is possible to achieve a safer product with a longer shelf live and the same or better texture (fracture stress and strain properties) in less time, less space, and with less product loss.

SUMMARY

The invention uses rapid heating to effect a material property change in a biomaterial. The biomaterial is heated to a predetermined real temperature, whereas the biomaterial's total thermal treatment is described by an equivalent temperature and an equivalent time defining a point above a minimum gel set (gel formation) temperature line. The point is preferably above a reduction in bacteria line and below a water loss line and/or a maximum desired gel texture temperature line.

According to one aspect of the invention, microwave energy is used to effect a material property change in a biomaterial. The biomaterial is heated to a predetermined real temperature, by exposing the biomaterial to a relatively uniform electric field. The relatively uniform electric field is preferably achieved by an electromagnetic exposure chamber as described and claimed in U.S. Pat. No. 6,087,642 to Joines et al., which is incorporated by reference herein, or co-pending application Ser. No. 09/300,914 of Joines et al., which is also incorporated by reference herein. Both electromagnetic exposure chambers create a focal region that provides relatively uniform heating along a path from a first side of the electromagnetic exposure chamber to a second side of the electromagnetic exposure chamber.

According to another aspect of the invention, an electromagnetic exposure chamber is tested to kinetically identify the thermal gel setting conditions. The material is exposed to a relatively uniform temperature distribution within the electromagnetic exposure chamber and heated to a predetermined real temperature at a predetermined heating rate. The material is preferably heated such that the temperature of the material decreases concentrically towards the material's edges.

According to another aspect of the invention, the material is heated to a predetermined temperature for a predetermined time in order to achieve a food product characterized by a preselected refrigerated shelf life of from about two weeks to about forty-two weeks. The food product may be packaged prior to the microwave exposure so as to sterilize the packaging and decrease product loss.

According to another aspect of the invention, the material is heated to a predetermined real temperature $T_1$ from time A to time B, whereas the biomaterial's total thermal treatment is described by an equivalent temperature and an equivalent time defining a point below a minimum gel set temperature line, and heated to a predetermined real temperature $T_2$ from time B to time C, whereas the biomaterial's total thermal treatment is described by an equivalent temperature and an equivalent time defining a point above a minimum gel set temperature line.

According to another aspect of the invention, the material is heated to a predetermined real temperature from time A to time B to attain a material property at shear stress level $S_1$, whereas the biomaterial's thermal treatment is described by an equivalent temperature and an equivalent time defining a point below a minimum gel set temperature line, and heated to a predetermined real temperature from time B to time C to attain at least one additional material property at shear stress level $S_2$, whereas the biomaterial's thermal treatment is described by an equivalent temperature and an equivalent time defining a point above a minimum gel set temperature line.

According to another aspect of the invention, the material is moved through an electromagnetic exposure chamber in a step-wise manner such that the material moves at a predetermined rate $R_1$ from time A to time B and a predetermined rate $R_2$ from time B to time C. The material is preferably stationary (i.e. $R_2=0$) from time B to time C.

According to another aspect of the invention, multiple microwave cavities are used to effect the material property change in the biomaterial. The material is passed through at least one additional microwave cavity that is sequentially arranged or concurrently arranged with the first microwave cavity.

BRIEF DESCRIPTION OF THE DRAWINGS

The foregoing, and other objects, features, and advantages of the invention will be more readily understood upon reading the following detailed description in conjunction with the drawings in which.

DETAILED DESCRIPTION

Figure 1A:
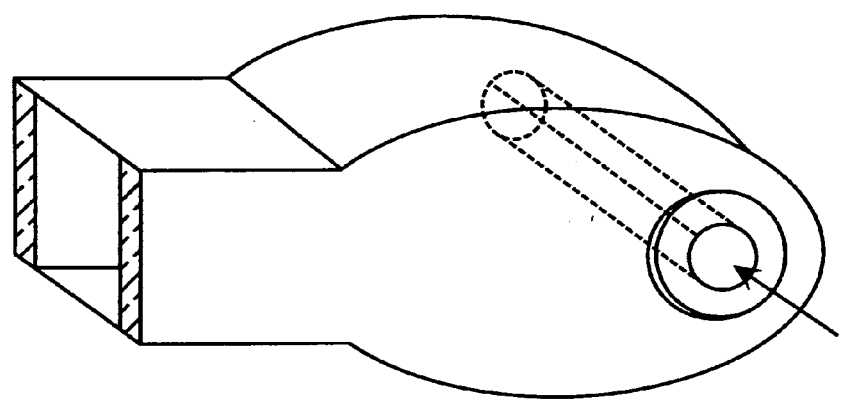
FIGS. 1A and 1B are examples of microwave cavities.

In the following description, specific details are discussed in order to provide a better understanding of the invention. However, it will be apparent to those skilled in the art that the invention can be practiced in other embodiments that depart from these specific details. In other instances, detailed descriptions of well-known methods and circuits are omitted so as to not obscure the description of the invention with unnecessary detail.

The invention uses rapid heating to effect a material property change defined as thermal gelation. For purposes of the present description, thermal gelation is defined as converting a food or biomaterial by application of increased temperature from a liquid or semi-liquid pourable or pumpable state into a solid or elastic state that retains its shape or the shape of the container vessel. The biomaterial is preferably heated using microwave energy delivery within a relative uniform microwave energy field and under controlled conditions. Uniformity refers to creating a microwave energy environment within the exposure region that results in the minimization of hot spots.

The invention is not limited to formation of gels in a chemical sense. It also includes the physical, structural, thermal, chemical, enzymatic, microbial, physical, and organoleptic changes occurring during the thermally-induced gelation or coagulation responsible for inducing the state change in some portion of the product being processed (a variety of liquids, solutions, emulsions and suspensions containing single or multiple components). These changes can include gelation, protein degradation, flocculation, sedimentation, separation, diffusion, pasteurisation, sterilization, flavor formation, texture modification, permeation, matrix formation, coagulation, polymer formation, etc.

The materials and process that can be treated include, but are not limited to, protein gel preparations (such as surimi), sausage and salami mixes (such as frankfurter formulations), other animal, vegetable, microbial or synthetic protein-based preparations, as well as bio- or synthetic polymer mixes, including naturally occurring, modified, or synthesized polysaccharide-based polymers, such as starch, cellulose, and various gums.

The products that can be produced include, but are not limited to, thermo-formed egg or modified egg omelettes optionally including cheese, sausage, ham, bacon or other ingredients, single-phase or multi-phase (containing pieces of meats, vegetables, fruits, etc.) sausage-type products, thermo-settable cheeses, textured vegetable protein preparations, puddings, deserts, yogurt-type products, etc. Furthermore, the process can be applied to whey protein thermo-settable gels, synthetic polymer preparations, and materials developed in the future that could benefit from this process.

The invention implements the microwave energy delivery to the material residing within a relatively uniform microwave energy field to implement a desirable temperature distribution throughout the product mass.

Figure 1B:
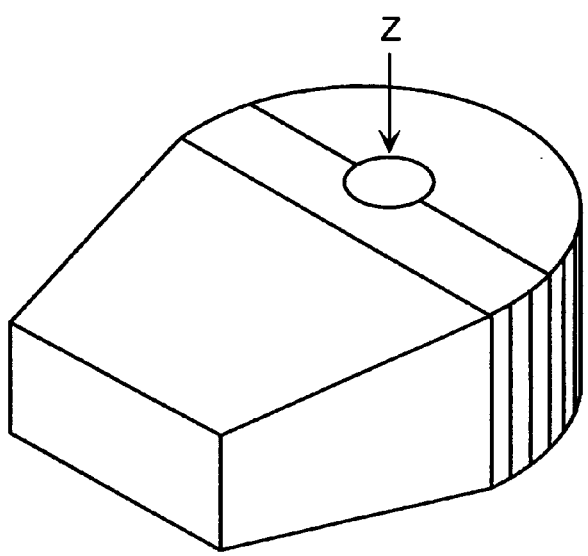

FIG. 1A illustrates a microwave cavity as described and claimed in U.S. Pat. No. 6,087,642 to Joines et al. FIG. 1B illustrates a microwave cavity as described and claimed in co-pending application Ser. No. 09/300,914 of Joines et al., now U.S. Pat. No. 6,265,702. Both microwave cavities create a focal region that provides relatively uniform heating along a path from a first side of the electromagnetic exposure chamber to a second side of the electromagnetic exposure chamber.

Figure 2A:
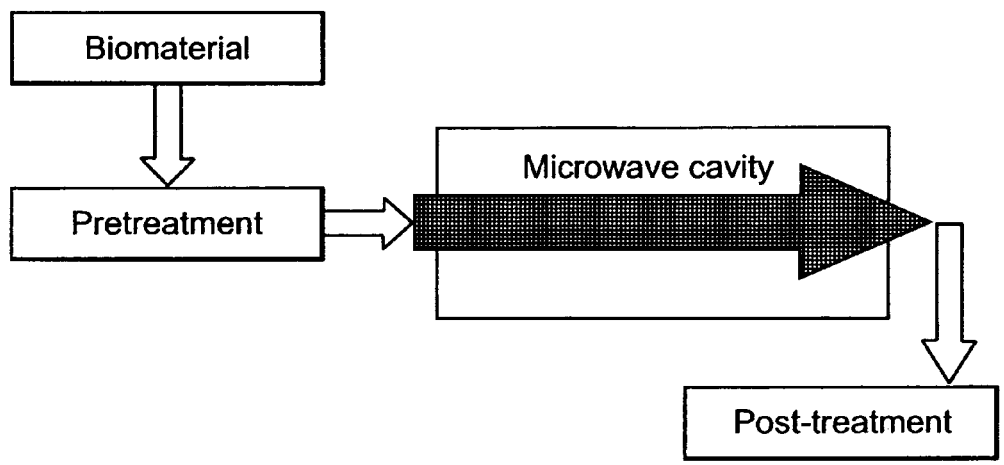
FIG. 2A is a flowchart of a method for using microwave energy to effect a material property change in a biomaterial.
Figure 2B:
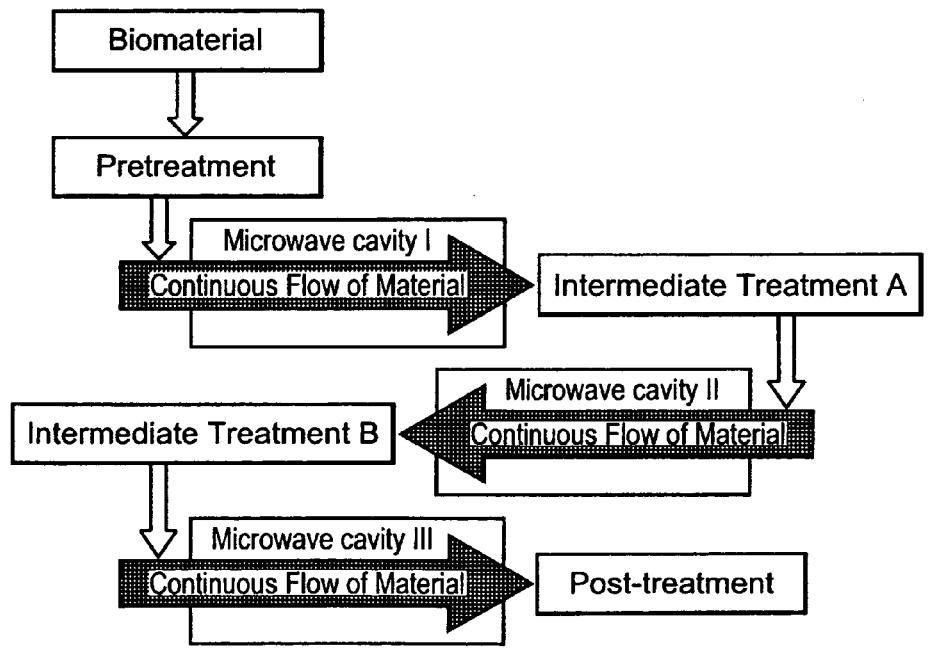
FIG. 2B is a flowchart of a method for using multiple microwave cavities to effect a material property change in a biomaterial.
Figure 2C:
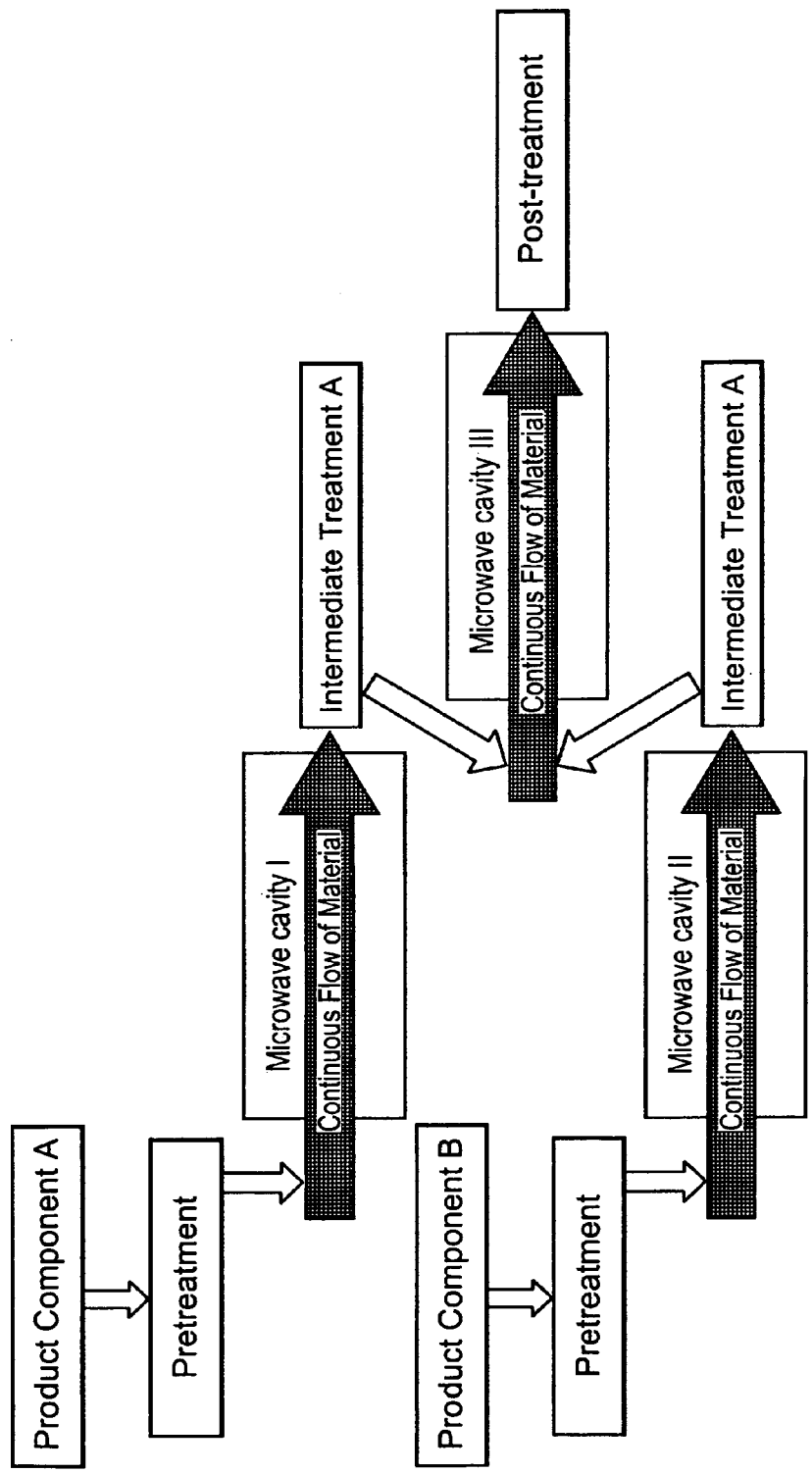
FIG. 2C is a flowchart of another method for using multiple cavities to effect a material property change in a biomaterial.

FIG. 2A illustrates a flowchart of a method for using microwave energy to effect a material property change in a biomaterial. The method illustrated in FIG. 2A takes advantage of a microwave cavity that provides a relatively uniform temperature distribution, but not necessarily the microwave cavities illustrated in FIGS. 1A and 1B. FIG. 2B is a flowchart of a method for using multiple microwave cavities to effect a material property change in a biomaterial. More specifically, FIG. 2B illustrates multiple microwave cavities in a serial (or sequential) arrangement FIG. 2C is a flowchart of another method for using multiple microwave cavities to effect a material property change in a biomaterial. More specifically, FIG. 2C illustrates multiple microwave cavities in a parallel (or concurrent) arrangement and multiple microwave cavities in a serial (or sequential) arrangement. The biomaterial can be packaged at any time during the process. If the biomaterial is packaged before microwave exposure, it is possible to use the microwave to sterilize the package and achieve a final product with less water/product loss.

Continuous flow can be implemented in a variety of configurations (straight tube, dimpled tube, or helically grooved tube) that enhance mixing and reduce component separation, planar configuration, multi-layer planar configurations, and/or flow-through of individual product dies/packs retained with the thermo-gelled material or removed/reused in the process. Similar geometry and varying geometries of individual and multiple parallel and/or successive continuous flow microwave cavities are also envisioned by the process. Therefore, specific products or product components can be initially treated in a first cylindrical microwave reactor followed by a single or multiple cylindrical microwave reactors or optionally by single or multiple planar microwave treatment assemblies or other cavity geometries. The invention also encompasses all concurrent, sequential, or parallel treatment combinations of products or product components outlined in the introduction using individual or combinations of any of the listed types of microwave cavities or any type of microwave cavity capable of supporting treatment under continuous flow conditions: single and multi-mode, standing wave, and traveling wave configurations.

Figure 3:
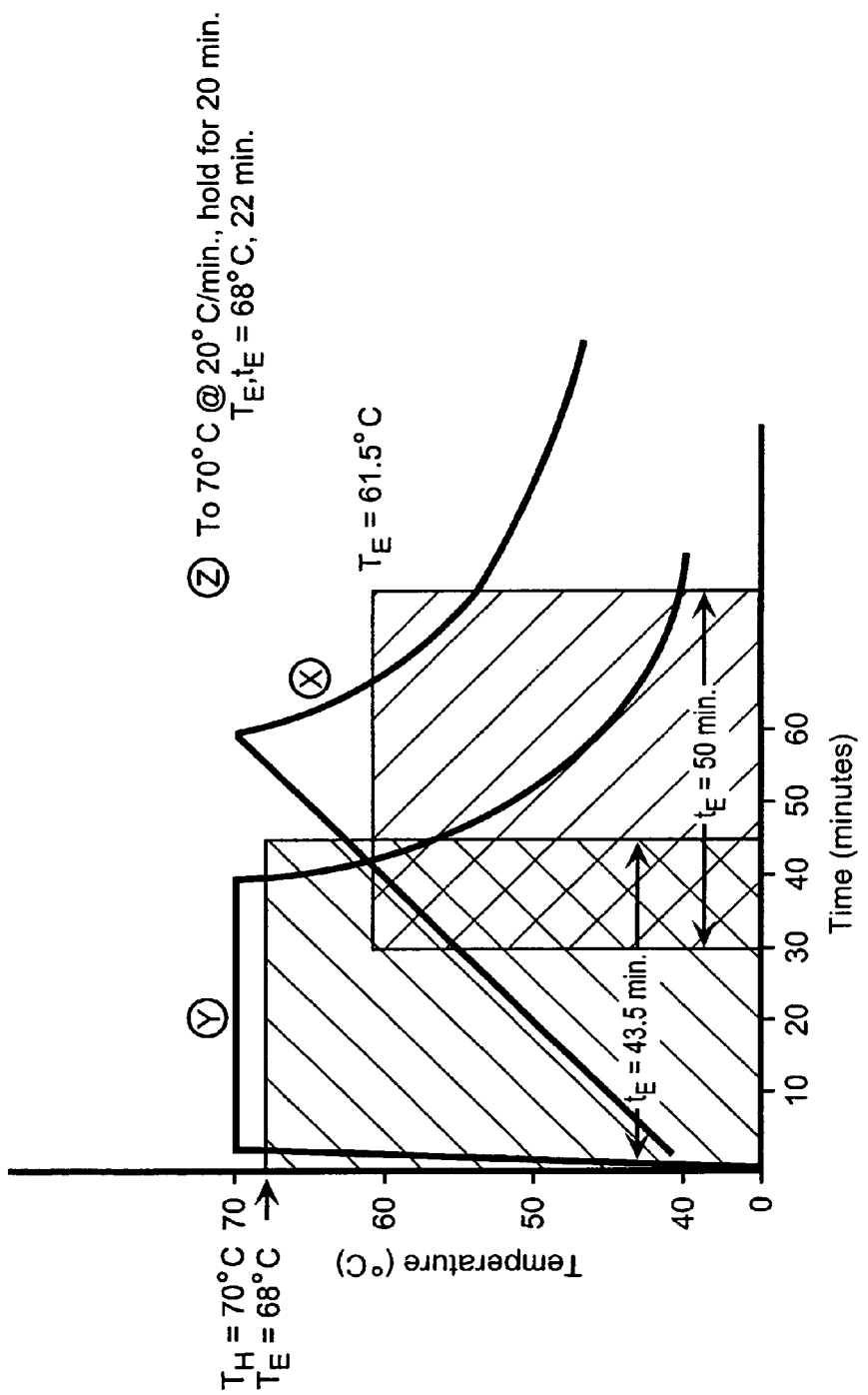
FIG. 3 is a diagram illustrating the differences and relations between real holding times and holding temperatures, and equivalent times and equivalent temperatures for describing total thermal treatments.

FIG. 3 is a diagram illustrating the differences and relations between real holding times and holding temperatures, and equivalent times and equivalent temperatures for describing total thermal treatments. With available time-temperature curves and a basic knowledge of kinetic relationships, equivalent points can routinely be calculated. The log of a product constituent concentration ratio (initial concentration divided by concentration after treatment) is set equivalent to the integration of that constituent's Arrhenius equation (or any other appropriate function describing the temperature dependency of the rate of the reaction associated with the constituent change) for the particular time-temperature interval (thermal history previously defined). For a given activation energy each section of a thermal treatment (heating, holding, and cooling) will produce a unique thermal constituent concentration ration. For the different sections the effect may be summed. For the original activation energy selected, a linear infinite log (time)-temperature relationship exists. Any and all of these infinite time and temperature combinations would produce the same thermal effect on a constituent (with the same activation energy) as during the original thermal treatment. By reexamining the original thermal curves with different activation energies a series of infinite linear log (time)-temperature relationships are developed (one line in a log (time)-temperature plot per activation energy). Uniquely all lines intersect at one point. This unique time-temperature is the equivalent point for the original thermal curve. It accounts for all thermal treatment and is used to accurately predict constituent change, or product characteristic.

In a first example X, a salted turkey breast paste in a stainless or TEFLON tube is heated to 70° C. at 0.5° C./minute and immediately cooled in ice water. The equivalent temperature ($T_E$) is 61.5° C. The equivalent time ($t_E$) is 50 minutes. The resulting gel has a stress of 29.58 KPa, a strain of 1.28, and a water loss of 15%.

In a second example Y, a turkey breast paste in a stainless or TEFLON tube is heated to 70° C. at 20° C./minute, held for 37 minutes, and then immediately cooled in ice water. The equivalent temperature ($T_E$) is 68° C. The equivalent time ($t_E$) is 43.5 minutes. The resulting gel has a stress of 29.58 KPa, a strain of 1.28, and a water loss of 15%.

It will be appreciated by those skilled in the art that decreasing the amount of water loss increases the amount of final product and decreases the fat and cholesterol content. In a third example Z, a turkey breast paste in a stainless or TEFLON tube is heated to 70° C. at 20° C./minute, held for 20 minutes, and then immediately cooled in ice water. The equivalent temperature ($T_E$) is 68° C. The equivalent time ($t_E$) is 22 minutes. The resulting gel has a stress of 30.5 KPa, a strain of 1.49, and a water loss of only 6%.

Figure 4:
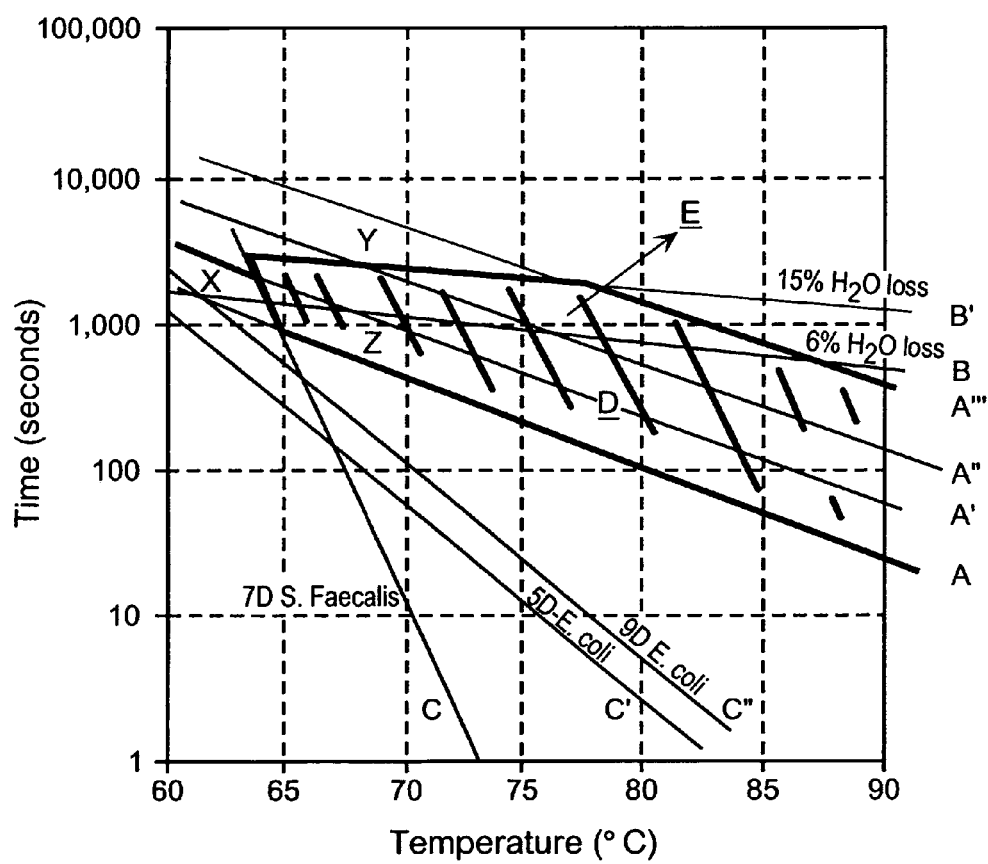
FIG. 4 is a graph showing time and temperature regions for the thermal gelation of an exemplary product.

FIG. 4 is a graph showing approximate time and temperature regions for the thermal gelation of an exemplary product. Similar graphs for egg, fish, meat, or soy products can readily be prepared without undue experimentation. Points X, Y, and Z correspond to the equivalent temperatures and equivalent times found in examples X, Y, and Z above.

Connecting points X and Z, it is possible to generate a line A' corresponding to products with equal texture. Line A corresponds to a minimum gel set temperature line; line A" corresponds to an acceptable texture; and line A''' corresponds to a maximum desired gel texture. Line B corresponds to a 6% water loss; line B' corresponds to a 15% water loss.

The line defining thermal treatments causing a seven log cycle reduction in the spoilage bacteria *Streptococcus faecalis* is labled in FIG. 4 as line C. Line C has a steeper slope than lines A, A', A", and A'''. This illustrates that thermal treatments employing higher temperatures and shorter times are preferred for practicing the present invention. Thus, holding final product texture constant as measured in fracture stress and strain (so that treatment time must be decreased as treatment temperature is increased), thermal treatments in which the product is subjected to treatment temperatures of about 67.0 degrees Centigrade or more are preferred to thermal treatments in which the product is subjected to treatment temperatures of 65° C.; treatment temperatures of about 69.0° C. or more are preferred to treatment temperatures of 67° C.; treatment temperatures of about 71.0° C. or more are preferred to treatment temperatures of 69° C.; treatment temperatures of about 73.0° C. or more are preferred to 71° C.; and so on. The foregoing statement is true whether the real temperatures (or holding temperatures) of the processes are being compared, or equivalent temperatures are being compared (thus the term "treatment temperature" is used to encompass both).

The thermal treatment should be sufficient to cause the biomaterial to gel. The thermal treatment should not, however, exceed the 15% water loss line or the maximum gel set temperature line. The biomaterial should be heated to a predetermined real temperature, whereas the biomaterial's total thermal treatment is described by an equivalent temperature and an equivalent time defining a point above lines A and C, but below lines B' and A''', within a region illustrated in FIG. 4 as shaded region D. Introducing shear stress shifts the shaded region D in direction E.

Figure 5:
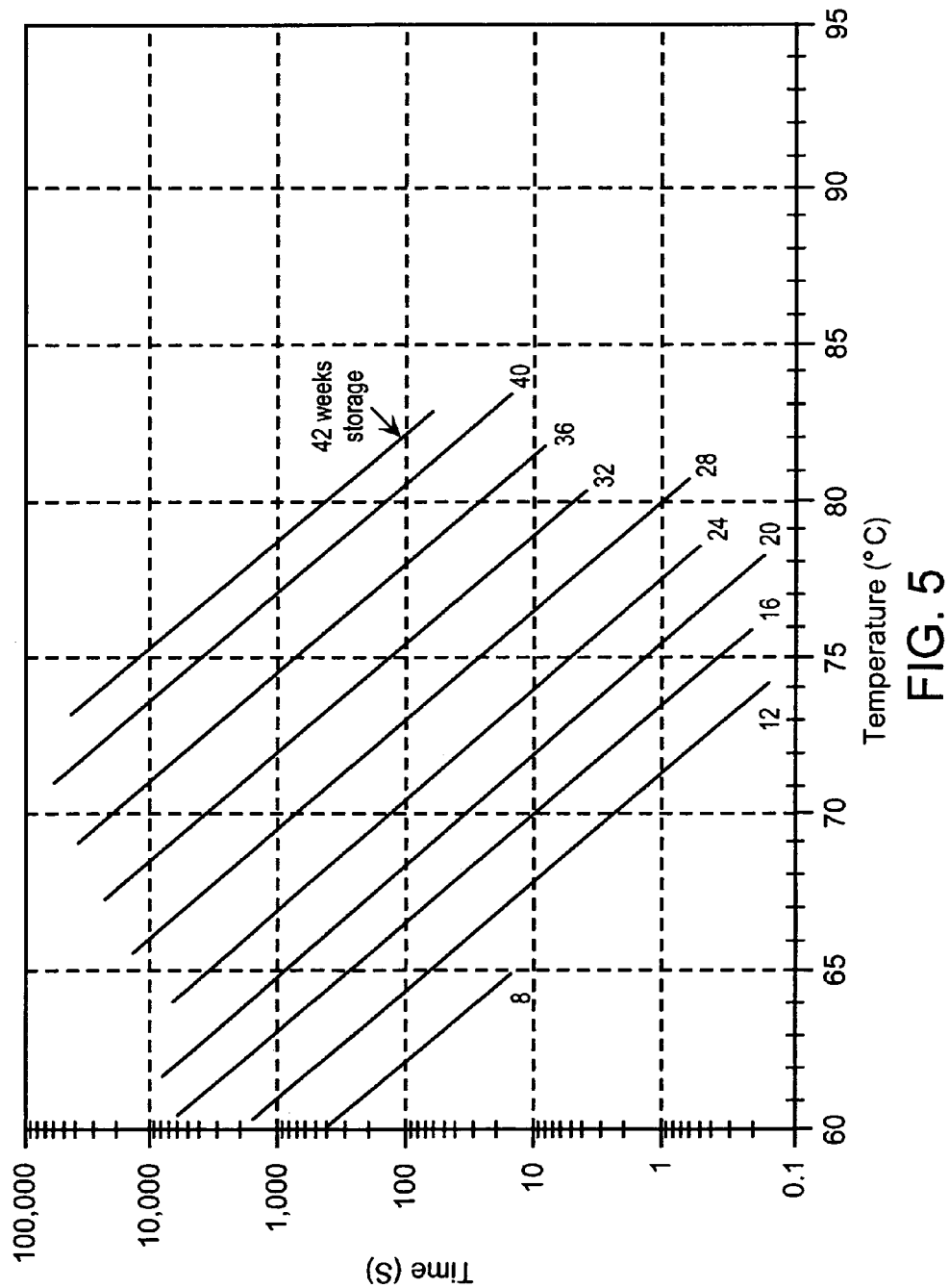
FIG. 5 illustrates the approximate refrigerated shelf life of an exemplary product.

FIG. 5 illustrates the approximate refrigerated shelf life of an exemplary product. The term "refrigerated," as used herein, means stored at a temperature of 4° C. Time and temperatures for points on each line represent equivalent times and temperatures, as also explained above. A food product having a preselected shelf life of from about 8–42 weeks is made by selecting a point on a line or in a region which will provide the desired shelf life, determining the equivalent time and equivalent temperature which correspond to the point selected, and—preferably through the use of the equivalent point method—establishing the operating conditions on the particular pasteurizing apparatus being used that will provide the selected thermal treatment. Products having shelf lives not depicted in FIG. 5 are made by extrapolating the teachings of the figure, in light of the teachings above. Preferably, this process is carried out in a pasteurizing apparatus which has been sterilized prior to passing the product therethrough, as explained above, to produce products having shelf lives of about two weeks or more. In addition, it will be appreciated that longer shelf lives are generally obtained at the expense of greater levels of moisture loss and/or texture change. Thus, if product distribution systems do not require otherwise, products with shelf lives of up to about 42 weeks are preferred, and products with shelf lives up to about 32 weeks are more preferred.

As long as the microwave cavity has two substantially parallel surfaces and an elliptical shape that directs the electromagnetic wave to a focal region that extends from the first substantially planar surface to the second substantially planar surface, it is possible to achieve a temperature distribution that is better than conventional heating methods.

In an exemplary embodiment, the temperature in the center of the material is slightly greater and the temperature slightly decreases concentrically towards the material's edges. This distribution establishes several unique advantages. For example, the target temperature of the bulk of material mass can be adjusted very accurately to be at or above the gel formation temperature (or any temperature-induced change temperature as listed in the introductory part of the invention description), while maintaining the target temperature of the external, tube or die-contacting material below the bulk material temperature and optionally below the gel-formation temperature while within the microwave cavity. Unique advantageous characteristics of materials treated by this process include better textural properties (gel strength, chewability, fracturability, etc.), better preservation of nutritional components like heat-degradable vitamins, and better uniformity of the product throughout.

Other embodiments of the invention can employ the manipulation of the microwave energy focus to effect various spatially and temporally selective temperature distributions in food and biomaterial treatments such as selective component treatments, laminated, layered and composite treatment of material and spatial components of composite products. An example application in a planar configuration would be successive deposition and gelation of individual product layers enabling the combinations of product components that would otherwise be difficult or impossible to join (layered sequential thermal treatments of sandwich-type products, layered cakes, multiple gel-solid-gel combinations, etc.).

The invention takes advantage of the virtually instantaneous feedback response control and continuously selective rate of microwave energy delivery. This rapid control of the uniform microwave energy field enables the rapid ramp up of the entire temperature range without any hot spots. Thus the selected products or product components can be treated rapidly or gradually as needed, benefiting the product throughput and quality.

Figure 6A:
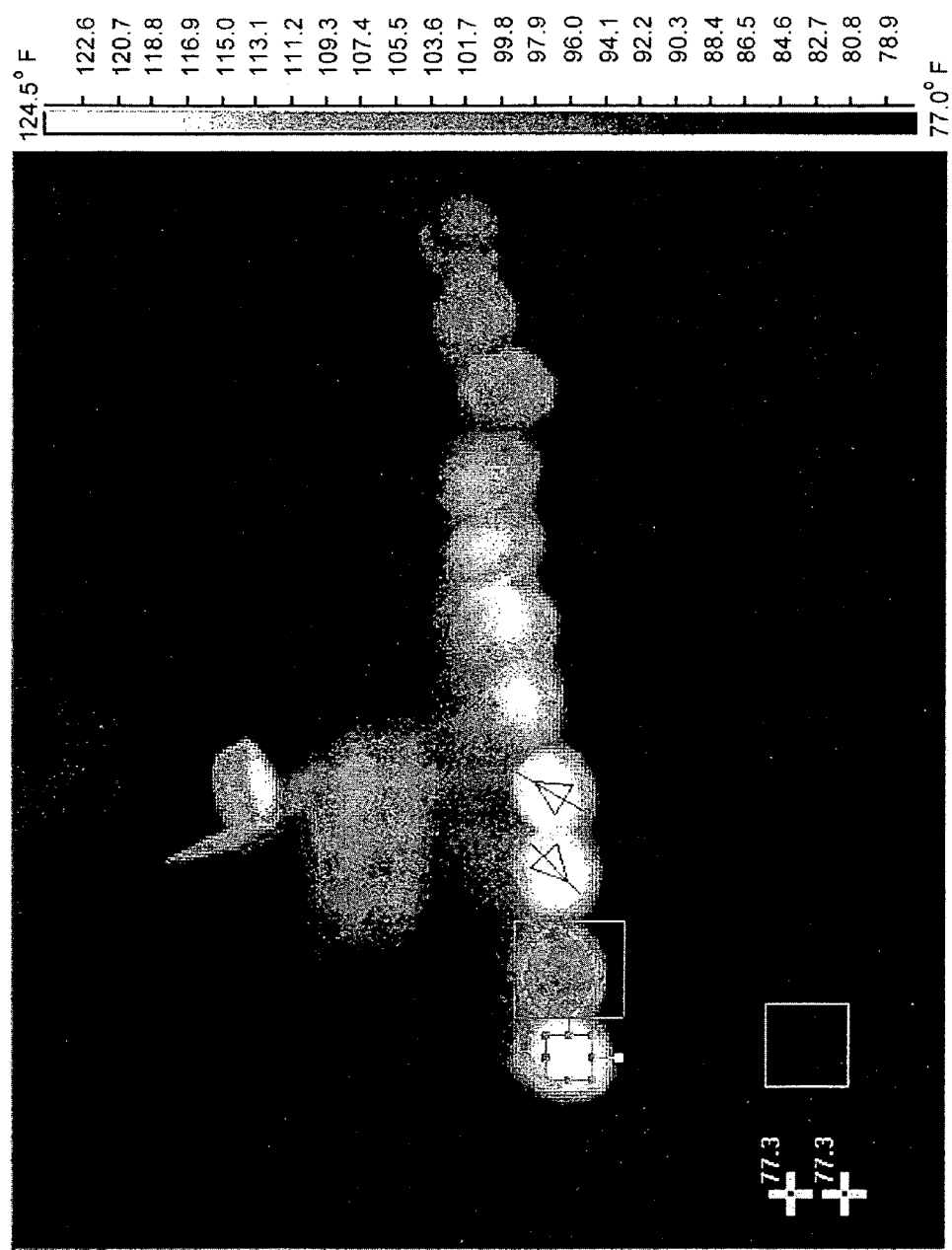
FIG. 6A is an image of a cross sectional temperature profile of a thermo-gelled biomaterial upon exiting a microwave cavity.
Figure 6B:
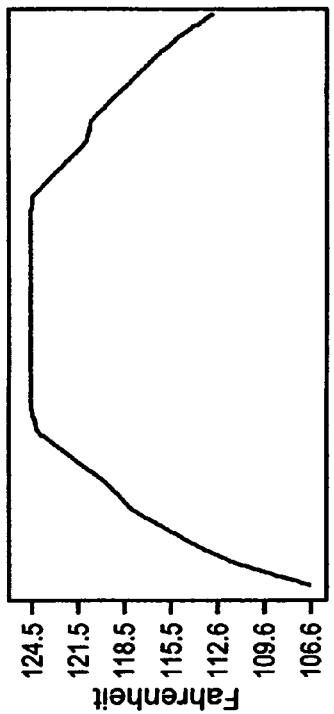
FIGS. 6B-6E are linear cross-sectional temperature profiles of a thermo-gelled biomaterial upon exiting a microwave cavity.
Figure 6C:
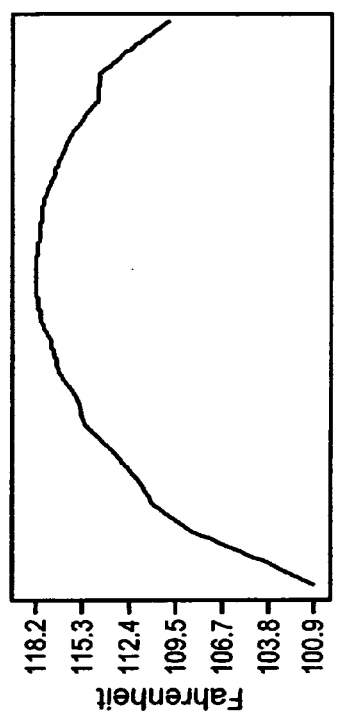
Figure 6D:
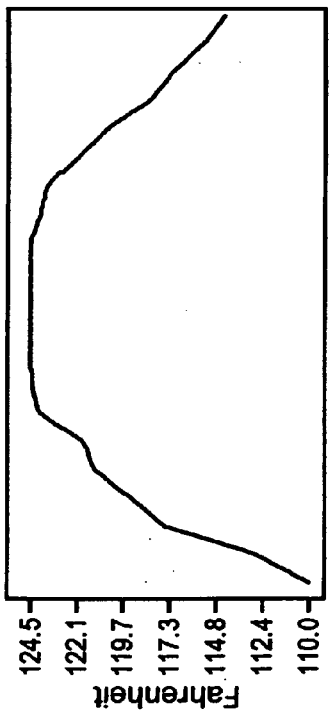
Figure 6E:
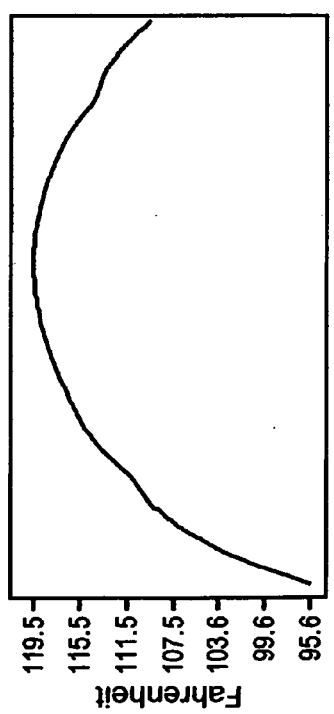

FIGS. 6A and 6B illustrate a uniformally high temperature in a center of a material and a slight temperature decrease at the edges of the material. More specifically, FIG. 6A illustrates an image of a cross-sectional temperature profile of a thermo-gelled biomaterial upon exiting a microwave cavity. The image in FIG. 6A was taken with an infrared thermal radiometric camera. FIG. 6B illustrates linear cross-section profiles of a thermo-gelled biomaterial upon exiting a microwave cavity. The linear cross-sectional temperature profiles in FIG. 6B were obtained by thermal image analysis.

Unique temperature distribution in the exemplary embodiment described above enables the implementation of a rapid, precisely targeted, and relatively uniform thermal treatment to the bulk of material, while minimizing thermal nutrient degradation, material loss through evaporation, and/or reduction of thermal energy transfer caused by material burn-on to the edges of the tube or container vessel. A unique thermal evaluation technique (line intersection equivalent point method) is used to integrate the product thermal history distribution. Basic knowledge of product constituent kinetics that define physical and chemical changes during treatment are incorporated into the model.

Desirable product changes (gel formation, microbial reduction) can then be controlled during the process and balanced with the undesirable changes (nutrient destruction, product functionality degradation) rendering the optimal and targeted end result. Accurate characterization and optimization of thermal treatment throughout the product mass provides process optimization greater than processes available heretofore.

In a first example, TEFLON tubes are filled with salted surimi paste and capped with a ceramic cap. Each TEFLON tube is between 17 and 20 cm long. Each TEFLON tube is placed on a conveyor belt that passes through a microwave chamber like the one illustrated in FIG. 1B. The focal region from the first side of the cylindrical reactor to the second cylindrical reactor is approximately 17 to 20 cm long. The conveyor belt moves at a constant rate such that any given portion of the surimi is heated for about 60 seconds to 120 seconds. The microwave energy in the cylindrical reactor is maintained such that the surimi is heated between 70° C. and 90° C. When TEFLON caps are used to close the tubes, the surimi at the ends is heated less. When ceramic caps are used to close the tubes, the surimi at the ends is heated uniformly. Final products with 6% water loss had better textural properties than conventional methods.

In a second example, a meat paste with a high fat content is preheated at a lower temperature. The meat paste is heated to a predetermined real temperature $T_1$ from time A to time B, whereas the biomaterial's total thermal treatment is described by an equivalent temperature and an equivalent time defining a point below a minimum gel set temperature line, and heated to a predetermined real temperature $T_2$ from time B to time C, whereas the biomaterial's total thermal treatment is described by an equivalent temperature and an equivalent time defining a point above a minimum gel set temperature line.

In a third example, a meat paste is heated to a predetermined real temperature from time A to time B to attain a material property at shear stress level $S_1$, whereas the biomaterial's thermal treatment is described by an equivalent temperature and an equivalent time defining a point below a minimum gel set temperature line, and heated to a predetermined real temperature from time B to time C to attain at least one additional property at shear stress level $S_2$, whereas the biomaterial's thermal treatment is described by an equivalent temperature and an equivalent time defining a point above a minimum gel set temperature line. For example, the meat paste is delivered by continuous flow to a hollow mold. The flow of the meat paste shifts the shaded region D in FIG. 4 in direction E. Once the meat paste is delivered to the hollow mold, the equivalent temperature and equivalent time is no longer below line A.

In a fourth example, an edible casing with a length greater than 30 cm is filled with a meat paste and twisted into links having a length between 12 cm and 18 cm. The edible casing is placed on a conveyor belt that passes through a microwave chamber like the one illustrated in FIG. 1B. The microwave energy in the cylindrical reactor is maintained such that the meat paste is heated between 70° C. and 90° C. Recent studies have shown, however, that as the length of the object to be heated increases the frequency of hot spots increases. To overcome this problem, the conveyor belt is controlled to make the object to be heated appear shorter. For example, the material is moved through the electromagnetic exposure chamber in a step-wise manner such that the material moves at a predetermined rate $R_1$ from time A to time B and a predetermined rate $R_2$ from time B to time C. The material is preferably stationary (i.e. $R_2=0$) from time B to time C.

Preliminary, simultaneous, concurrent or finishing thermal treatments to effect gelation or other desirable characteristics of the food or biomaterial (and/or its components) can be also optionally and selectively achieved by conventional means such as conduction (hotter internal material provides the heat treatment to the cooler external material), convection (hot air treatment of the external layer/surface to optionally effect partial drying, flavor, texture and skin formation), radiation (IR heating), frying, contact-heating (searing) etc.

Optional pre-treatments, intermediate, concurrent and/or post-treatments can also be implemented to the surface or selected components of the food or biomaterial before or after the exit from the microwave treatment cavity.

These optional treatments can be physical (slicing, portioning, packaging etc.), thermal (e.g. controlled skin formation by exposure to various heat sources), chemical (spraying with thermo-treatable coatings to enhance flavor, appearance, texture or nutrient composition, exposure to smoke in gaseous, liquid or dry form) or combined (addition of coatings, dips, batters, enclosures, etc.) and can be designed to react and combine with the material surface to achieve superior organoleptic and nutritional product characteristics.

While the foregoing description makes reference to particular illustrative embodiments, these examples should not be construed as limitations. It is envisioned that the benefits of the present invention utilizing FIGS. 4 and 5 can be achieved by other rapid uniform heating methods (i.e. electric resistance heating (ohmic), radio frequency heating, electric pulsed heating, infrared, and sonic). Thus, the present invention is not limited to the disclosed embodiments, but is to be accorded the widest scope consistent with the claims below.

What is claimed is:

1. A method for using rapid heating to effect a material property change in a biomaterial as part of a total thermal treatment of the biomaterial, the method comprising the step of heating the biomaterial to a predetermined real temperature, whereas the total thermal treatment of the biomaterial is described by an equivalent temperature and an equivalent time defining a point above a minimum gel set temperature line, wherein the total thermal treatment of the biomaterial is described by an equivalent temperature and an equivalent time defining apoint below line A''' of FIG. 4.

2. A method according to claim 1, wherein the total thermal treatment of the biomaterial is described by an equivalent temperature and an equivalent time below line B' of FIG. 4.

3. A method according to claim 1, wherein the total thermal treatment of the biomaterial is described by an equivalent temperature and an equivalent time below line B' of FIG. 4.

4. A method according to claim 1, wherein the total thermal treatment of the biomaterial is described by an equivalent temperature and an equivalent time defining a point above line C of FIG. 4.

5. A method according to claim 4, wherein the total thermal treatment of the biomaterial is described by an equivalent temperature and an equivalent time defining a point below line A''' of FIG. 4.

6. A method according to claim 4, wherein the total thermal treatment of the biomaterial is described by an equivalent temperature and an equivalent time below line B' of FIG. 4.

7. A method according to claim 5, wherein the total thermal treatment of the biomaterial is described by an equivalent temperature and an equivalent time below line B' of FIG. 4.

8. A method according to claim 1, wherein the total thermal treatment of the biomaterial is described by an equivalent temperature and an equivalent time within shaded region D.

9. A method according to claim 8, wherein the total thermal treatment of the biomaterial is described by an equivalent temperature and an equivalent time below line B of FIG. 4.

10. A method according to claim 1, wherein the total thermal treatment received by the biomaterial is described by an equivalent temperature and an equivalent time defining a point above a line characterizing a shelf life of from about two weeks to about forty-two weeks.

11. A method according to claim 1, wherein the biomaterial is heated to a predetermined real temperature $T_1$ from time A to time B, whereas the total thermal treatment is described by an equivalent temperature and an equivalent time defining a point below line A of FIG. 4, and heated to a predetermined real temperature $T_2$ from time B to time C, whereas the biomaterial's total thermal treatment is described by an equivalent temperature and an equivalent time defining a point above line A of FIG. 4.

12. A method according to claim 1, wherein the biomaterial is heated to a predetermined real temperature from time A to time B to attain a material property at shear stress level $S_1$, whereas the total thermal treatment is described by an equivalent temperature and an equivalent time defining a point below a minimum gel set temperature line, and heated to a predetermined real temperature from time B to time C to attain at least one additional material property at shear stress level $S_2$, whereas the total thermal treatment is described by an equivalent temperature and an equivalent time defining a point above a minimum gel set temperature line.

13. A method according to claim 1, wherein the biomaterial is moved at a predetermined rate $R_1$ from time A to time B and a predetermined rate $R_2$ from time B to time C.

14. A method according to claim 13, wherein $R_2$ is less than $R_1$.

15. A method according to claim 14, wherein the biomaterial is stationary during time B to time C.

16. A method for using rapid heating to effect a material property change in a biomaterial as part of a total thermal treatment of the biomaterial, the method comprising the step of heating the biomaterial to a predetermined real temperature, whereas the total thermal treatment of the biomaterial is described by an equivalent temperature and an equivalent time defining a point above a minimum gel set temperature line, wherein the step of heating the biomaterial comprises the step of passing the biomaterial through a relatively uniform electric field, wherein the total thermal treatment of an outside periphery of the biomaterial is described by an equivalent temperature and equivalent time defining a point below line A of FIG. 4.

17. A method for using rapid heating to effect a material property change in a biomaterial as part of a total thermal treatment of the biomaterial, the method comprising the step of heating the biomaterial to a predetermined real temperature, whereas the total thermal treatment of the biomaterial is described by an equivalent temperature and an equivalent time defining a point above a minimum gel set temperature line, wherein the step of heating the biomaterial comprises the step of passing an electric current through the biomaterial, wherein the total thermal treatment of the center of the biomaterial is described by an equivalent temperature and equivalent time defining a point above line A of FIG. 4.

18. A method according to claim 16, wherein the biomaterial is packaged prior to passing the biomaterial through the relatively uniform electric field.

19. A method according to claim 16, wherein the relatively uniform electric field is created by an elliptical shape that directs an electromagnetic wave to a focal region that extends from a first substantially planar surface to a second substantially planar surface.

20. A method according to claim 18, the method further comprising the step of exposing the biomaterial to a second electric field.

21. A method according to claim 20, wherein the second electric field is sequentially arranged.

22. A method according to claim 20, wherein the second electric field is concurrently arranged.

23. A method according to claim 13, wherein $R_2$ is less than $R_1$.

24. A method according to claim 14, wherein the biomaterial is stationary during time B to time C.

* * * * *